US006285752B1

(12) United States Patent
Rice (10) Patent No.: US 6,285,752 B1
(45) Date of Patent: Sep. 4, 2001

(54) AUTOMATED RIGHT-PARTY CONTACT TELEPHONE SYSTEM

(76) Inventor: Blake Rice, 6225 County Road 30, Waconia, MN (US) 55387

(*) Notice: Subject to any disclaimer, the term of this patent is extended or adjusted under 35 U.S.C. 154(b) by 0 days.

(21) Appl. No.: 09/216,274

(22) Filed: Dec. 18, 1998

Related U.S. Application Data (63) Continuation-in-part of application No. 09/170,501, filed on Oct. 13, 1998, which is a continuation-in-part of application No. 09/069,428, filed on Apr. 29, 1998, which is a continuation-in-part of application No. 08/994,110, filed on Dec. 19, 1997.

(51) Int. Cl.⁷ .................................................. H04M 3/00
(52) U.S. Cl. .............................. 379/266.07; 379/265.11
(58) Field of Search ......................... 379/265, 266, 379/309, 242, 243, 210.01, 214.01, 209.01, 219; 370/270

(56) References Cited

U.S. PATENT DOCUMENTS

| | | | |
|---|---|---|---|
| 4,620,066 | 10/1986 | Bushnell et al. | 379/113 |
| 4,689,815 | 8/1987 | Grewal et al. | 379/269 |
| 5,008,930 | 4/1991 | Gawrys et al. | 379/210 |
| 5,309,505 | * 5/1994 | Szlam et al. | 379/88.01 |
| 5,309,513 | 5/1994 | Rose | 379/265 |
| 5,335,268 | 8/1994 | Kelly, Jr. et al. | 379/265 |
| 5,335,269 | 8/1994 | Steinlicht | 379/265 |
| 5,392,346 | 2/1995 | Hassler et al. | 379/265 |
| 5,436,965 | * 7/1995 | Grossman et al. | 379/266 |
| 5,440,623 | 8/1995 | Moore et al. | 379/265 |
| 5,511,112 | * 4/1996 | Szlam | 379/88.25 |
| 5,515,428 | 5/1996 | Sestak et al. | 379/266 |
| 5,555,299 | 9/1996 | Maloney et al. | 379/212 |
| 5,563,937 | 10/1996 | Bruno et al. | 379/265 |
| 5,590,176 | 12/1996 | Agarwal et al. | 379/221 |
| 5,590,188 | 12/1996 | Crockett | 379/265 |
| 5,592,542 | 1/1997 | Honda et al. | 379/265 |
| 5,621,790 | * 4/1997 | Grossman et al. | 379/266 |
| 5,825,869 | 10/1998 | Brooks et al. | 379/265 |
| 5,889,799 | * 3/1999 | Grossman et al. | 379/266 |
| 5,923,745 | 7/1999 | Hurd | 379/265 |

FOREIGN PATENT DOCUMENTS 0 806 858 A2    11/1997   (EP) .

OTHER PUBLICATIONS

Declaration of Blake Rice.
Gunnerson, S., "Advancements in Dialer Technology", *Tele-Professional*, p. 44(May 1998).
"Mosaix 5000 Call Management System", 3 pages.
Viking Electronics, Inc., 1992 Products Catalog, p. 5.
Derville, D. et al., "Call Centers: A Strategic Issue for both Customers and Suppliers, " *Alcatel Telecommunications Review*, pp., 275–283(1996).
Hassler, K. et al., "Revolutionizing DEFINITY® Call Centers in the 1990s," *AT&T Technical Journal*, vol. 74, No. 4, pp. 64–73(Jul./Aug 1995).
Paris, G., "The next generation call center," *Perspectives*, 3 pgs.(1996).

* cited by examiner

*Primary Examiner*—Ahmad Matar
*Assistant Examiner*—Benny Q. Tieu
(74) *Attorney, Agent, or Firm*—Merchant & Gould P.C.

(57) ABSTRACT

A system is provided for routing telephone calls between at least first aid second groups of call-handling stations. A dialer is configured to automatically place telephone calls. Once the call is placed, the dialer routes the call to a first-level hunt group. The first-level hunt group searches for an available first-level call-handling station and routes the call to the available first-level call-handling station. Once the first-level call-handling station establishes contact with the right-party, the first-level call-handling station sends a routing signal to the dialer. The dialer then routes the call to a second-level hunt group, which searches for an available second-level call-handling station. Then the second-level hunt group routes the call to the available second-level call-handling station.

37 Claims, 2 Drawing Sheets

AUTOMATED RIGHT-PARTY CONTACT TELEPHONE SYSTEM

Reference to Co-Pending Applications

The present application is a continuation-in-part of U.S. patent application Ser. No. 09/170,501, filed on Oct. 13, 1998, and entitled AUTOMATED RIGHT-PARTY CONTACT TELEPHONE SYSTEM, which is a continuation-in-part of U.S. patent application Ser. No. 09/069,428, filed on Apr. 29, 1998, and entitled AUTOMATED RIGHT-PARTY CONTACT TELEPHONE SYSTEM, which is a continuation-in-part of U.S. patent application Ser. No. 08/994,110, filed on Dec. 19, 1997, and entitled AUTOMATED RIGHT-PARTY CONTACT TELEPHONE SYSTEM, the disclosures of which are hereby incorporated by reference.

TECHNICAL FIELD

This invention relates to telephone systems, and more particularly, to automated telephone systems and predictive dialers for establishing right-party contact.

BACKGROUND

The global marketplace is becoming more open and more efficient at providing goods and services. In the collection and tele-marketing industries, firms use a call-handling station as the crucial link between the firms and the person being contacted (right-party). Typically these firms use call-handling stations to place outbound calls, receive inbound calls, ask for right parties, leave messages, return calls, and conduct business with the right parties. The call-handling stations are segregated into groups, groups are assigned to handle specific call types arriving or leaving on telephone trunk lines, and trunk lines are designated for particular purposes such as support, sales, and collections.

One significant disadvantage of these existing call-center environments is that as few as ten percent of the calls result in contact with the right-party. Thus, the person manning the call-handling station spends most of his/her time trying to reach the right-party rather than conducting business with the right-party. As a result, the calling system requires a large staff to handle a significant volume of calls. A related problem is that the system requires call-handling equipment for each call-handler. The result is high overhead for wages, benefits, training, equipment, and the like.

Therefore, there is a need for a call-center environment that increases efficiency and reduces costs to the firms. There is also a related need for a telephone system that reduces the amount of time that call-handlers spend handling calls. There is yet another need for a way to track the efficiency and productivity of the call-handlers. Increasing call-handling efficiency and productivity would result in lower personnel and facility costs to the firms.

SUMMARY

A system is provided for routing telephone calls between first and second groups of call-handling stations. The system includes a dialer, a first hunt group and a second hunt group. The dialer is configured to place telephone calls. The first hunt group is configured and arranged to route a telephone call placed by the dialer to a call-handling station within the first group of call-handling stations. The second hunt group is configured and arranged to route the telephone call placed by the dialer to a call-handling station within the second group of call-handling stations upon receiving a call routing signal from the first group of call-handling stations.

According to another embodiment, a system is provided for routing telephone calls between call-handling stations. The system includes a dialer and a second hunt group. The dialer is configured and arranged to place telephone calls and transfer calls to a first hunt group. The dialer is responsive to routing signals received from a first call-handling station. The second hunt group is configured and arranged to route the telephone call placed by the dialer to a second call-handling station upon receiving a call routing signal from the first call-handling station.

According to another embodiment, a method is provided for routing telephone calls between first and second groups of call-handling stations. The method includes placing telephone calls; routing the telephone calls to a call-handling station within the first group of call-handling stations; and routing the telephone call to a call-handling station within the second group of call-handling stations upon receiving a call routing signal from the first group of call-handling stations.

According to another embodiment, a method is provided for routing telephone calls between a first-level call-handing station and a second-level call-handling station. The second-level call-handling station is selected from a plurality of second-level call-handling stations. The method includes routing the telephone call to the first-level call-handling station; selecting a criterion; matching a second-level call handling station and the selected criterion; and routing the telephone call to the matched second-level call-handling station.

Yet another possible embodiment of the present invention is directed to a method of operating a system for routing telephone calls between first and second groups of call-handling stations. The method comprises activating a predetermined number of call-handling stations in the first group; activating a predetermined number of call-handling stations in the second group; determining the relative number of first call-handling stations from a first equation:

(DIAL*CONNECT)/1ST_LEV_CALLAVE=1ST_LEV_HOURS, wherein DIAL represents a number of calls per hour placed by a predictive dialer; CONNECT represents a connect rate for the calls placed by the predictive dialer; and 1ST_LEV_HOURS represent an average number of calls handled per hours by one first call-handling station; and determining the relative number of second call-handling stations from a second equation:

(DIAL*CONNECT*R_CONNECT)/2D_LEV_CALLAVE=2D_LEV_HOURS, wherein 2D_LEV_HOURS represents a right-party connect rate; and 2D_LEV_HOURS represents an average number of calls handled per hour by one second call-handlino station.

Other embodiments of the present invention can include any of the various aspects of the apparatuses, systems, and methods as described herein.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

In general, the present invention is directed to the use of hunt groups to search for available call-handling stations in an automated right-party contact telephone system. Call control in the telephone system is routed to at least one first-level hunt group, which searches for an available first-level call-handling station. Upon confirming that the right-party is on the telephone line, the first-level call-handling station sends a routing signal, causing the call control to be routed to at least one second-level hunt group, which searches for an available second-level call-handling station. The second-level hunt group routes both the call and data to the available second-level call-handling station with minimal interaction between the first-level call-handling station and the second-level call-handling station.

This automated right-party contact telephone system has several advantages over existing call-center environments. The automated system allows lower-skilled call-handlers to screen and establish right-party contact, which in turn allows the higher-skilled call-handlers to conduct business with the right-party contact. Since the automated system searches for available call-handlers and automatically routes calls, significant call-handler time is saved, resulting in higher efficiency and productivity. As a result, the system has smaller staffing requirements and hence smaller equipment requirements. A related advantage is that the system reduces the amount of overhead required to operate the call-handling facility. Furthermore, the call handling facility can be more selective in hiring its skilled workers and has reduced training requirements.

Figure 1:
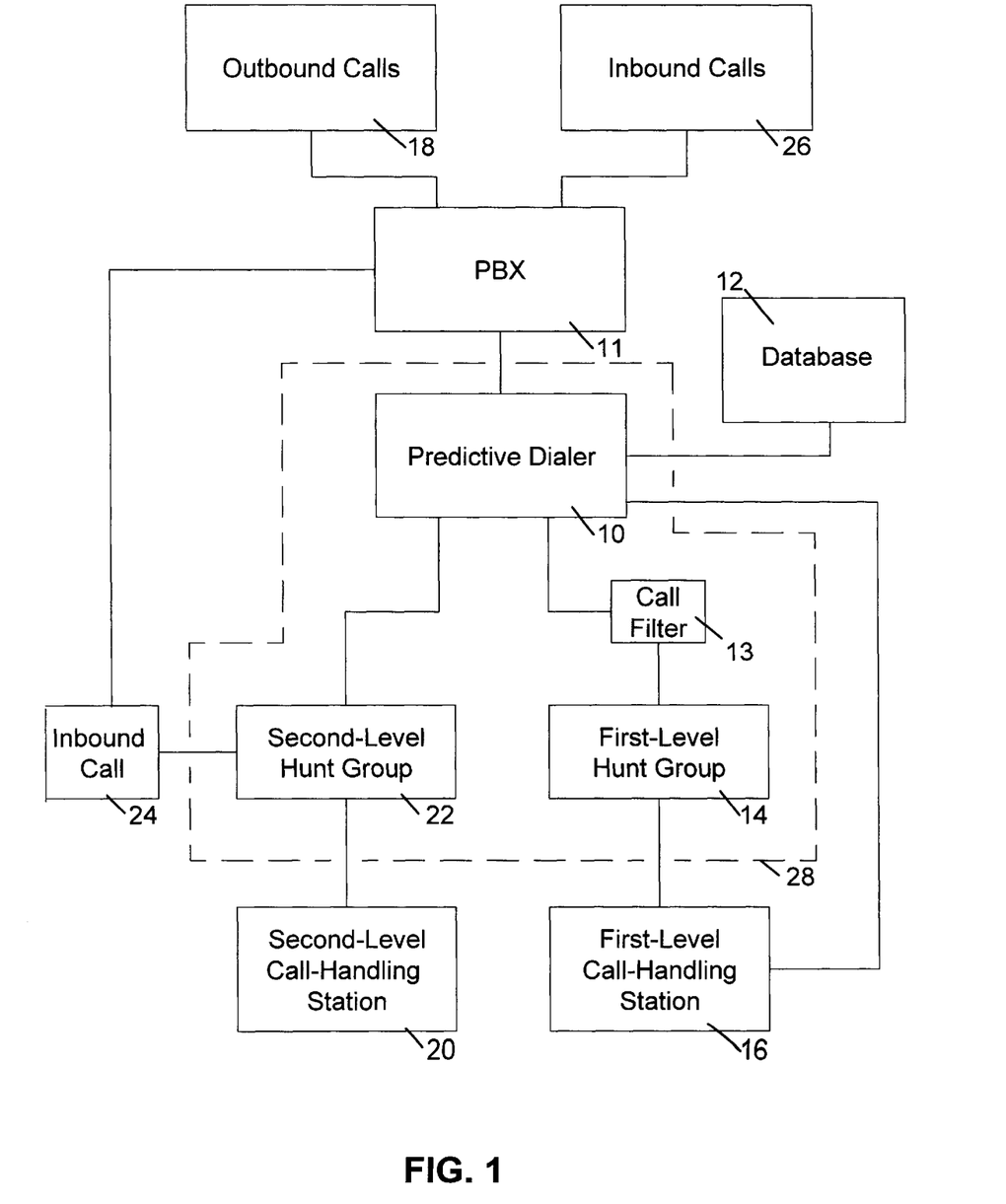
FIG. 1 is a block diagram of a multi-level telephone system.

Referring now to FIG. 1, a multi-level telephone system has a PBX 11 that can be PC-based. A predictive dialer 10, that can also be PC-based, is in electrical communication with the PBX 11, a call filter 13, and at least one second-level hunt group 22. At least one first-level hunt group 14 is in electrical communication with the call filter 13. In an alternative embodiment, there are a plurality of first-level hunt groups 14. Each first level hunt group 14 is in electrical communication with the call filter 13. In yet another possible embodiment, there are a plurality of second-level hunt groups 22. Each second-level hunt group 22 is in electrical communication with the predictive dialer 10. In yet another possible embodiment, the multi-level telephone system does not have a call filter 13. In this embodiment, the first-level hunt group 14 is in electrical communication with the predictive dialer 10.

In one example embodiment, the predictive dialer 10, call filter 13, first-level hunt group 14, and second-level hunt group 22 are integrated into a single dialing unit as shown by the dashed box 28. In this embodiment, the dialing unit 28 can be PCbased and software driven. The PBX 11 could also be integrated into the unitary dialing unit 28. In another example embodiment, the predictive dialer 10 and the PBX 11 are integrated into a single dialing unit. In another example embodiment, the PBX 11, predictive dialer 10, call filter 13, first-level hunt group 14, and second-level hunt group 22 are separate units. In yet another example embodiment, the PBX 11, predictive dialer 10, call filter 13, first-level hunt group 14, and second-level hunt group 22 are integrated into different combinations of equipment. For example, the PBX 11 and the second-level hunt group 22 may be integrated into a single unit, or the predictive dialer 10 and the first-level hunt group 14 may be integrated into a single unit. Any one of these combinations of equipment forms a dialer.

A database 12 is in electrical communication with the predictive dialer 10. The database 12 could also be integrated into the unitary dialing unit 28. The database 12 contains information such as the right-party contact's name, address, telephone number, and account information. At least one first-level call handling station is in electrical communication with each first-level hunt group 14. At least one second-level call-handling station 20 is in electrical communication with each second-level hunt group 22. Additionally, each second-level hunt group 22 is in electrical communication with the PBX 11.

In an example embodiment, the electrical communication between the dialing unit 28, including the predictive dialer 10, call filter 13, first-level hunt group 14, and second-level hunt group 22; first-level call-handling station 16; and second level call-handling station 20 include two links for electrical communication. One link, and its related drivers and other electronics, is configured for transmitting either analog or digital voice information. The other link, and associated drivers and other electronics, is configured for data transmission, including control signals and information to and from the database 12. In an alternative embodiment, both voice and data communication are transmitted over a single link. In another alternative embodiment, either voice or data communication are transmitted over a single link.

The first- and second-level call-handling stations 16 and 20 are computers or dumb terminals equipped with integrated telephonic features. This system can have either a headset or a handset interfaced with the computer for voice communication. An advantage of this system is that the person or call-handler manning the call-handling station can manage the telephone calls and information from the database 12. In one possible embodiment, call handling stations are of the type included in the SmartDial predictive dialing system, which is manufactured by Information Access Technologies, Inc. of Salt Lake City, Utah. An alternative embodiment simply has a computer and separate telephone. The person manning the call-handling station uses the telephone for voice communication and the computer to manage the database information. Yet another possible embodiment has a videophone with a computer. This embodiment allows the call-handler to not only manage the database information and communicate by voice, but also to interactively view the right-party contact.

The first- and second-level call-handling stations 16 and 20 are typically manned by people or call-handlers. When the call-handler at the first-level call-handling station 16 is available to take a call placed by the predictive dialer 10, he/she sets a flag that is communicated to the first-level hunt group 14. The first-level hunt group 14 receives the flags and places the flags in a queue. Similarly, when the call-handler at the second-level call-handling station 20 is ready to receive a call, he/she sets a flag that is communicated to the second-level hunt group 22, which receives the flags and places the flags in a queue.

The predictive dialer 10 retrieves telephone numbers and corresponding account information from the database 12 and automatically dials the telephone number through the PBX 11. When the predictive dialer 10 makes a connection with the telephone number dialed, the predictive dialer 10 routes the call and corresponding account information from the database 12 in a coordinated transmission through the call filter 13 to the first-level hunt group 14. In this manner, the voice information and the database information are communicated to the first-level call-handling station 16 at the same time.

The call filter 13 electronically screens calls being routed to the first-level hunt group 14. When a call is connected, the call filter 13 determines whether the information being received is from a natural person; an answering machine; or data from a fax machine, operator message, or the like. If the information received during the call is from a natural voice, the call filter 13 permits the call to be routed to the first-level hunt group 14. If the information is from an answering machine, an automated message can be left on the machine to have the right-party call the multi-level call station. If data is received from the called number, the call is terminated.

The first-level hunt group 14 searches for a flag of an available first-level call-handling station 16. When an available flag is found, the first-level hunt group 14 routes the call to the available first-level call-handling station 16. The call-handler at the first-level call-handling station 16 is responsible for establishing right-party contact at the connected telephone number, skip tracing, data corrections, and leaving messages. The call-handler can then update the database with notes on the conversation, updated telephone numbers, updated addresses, and the like.

The call-handler at the first-level call-handling station 16 will ask the party who answered the telephone if the right party is available. If the right party is not available, the first-level call-handling station 16 discontinues the call. The person at the first-level call-handling station 16 then resets its available flag so that it can take another call. The available flag is set by entering a code on the computer, pressing a function key on the computer, or pressing a control button on the telephone.

If the right-party is available, the first-level call-handling station 16 sends a routing signal to the predictive dialer 10. The predictive dialer 10 then routes the call and data corresponding to the caller's account information, the call, or the data corresponding to the account information. If the second-level hunt group 22 receives only the call, the predictive dialer routes the data to the second-level hunt group 22 at a later time. Alternatively, the second-level call-handling station 20 can manually access the data. Similarly, if the second-level hunt group 22 receives only the data, the predictive dialer routes the call to the second-level hunt group 22 at a later time. Alternatively, the second-level call-handling station 20 can manually connect to the call. Preferably, the predictive dialer 10 routes the call and the corresponding data to the second-level hunt group 22 in a coordinated manner. The second-level hunt group 22 searches for a flag of an available second-level call-handling station 20.

When an available flag is found, the second-level hunt group 22 routes the call and corresponding account information in a coordinated transmission to the available second-level call-handling station 20. The call and corresponding account information is then released from the first-level call-handling station 16, and the second-level call-handling station 20 communicates with the right-party. In one possible embodiment, furthermore, this coordinated transmission is conducted without the second-level call-handling station 20 choosing to accept the call. The call and data are automatically transmitted to an available second-level call-handling station without any required interaction on the part of the person operating the second-level call handling station or without any interaction between the first-level call-handling station 16 and the second-level call-handling station 20.

The call and corresponding account information is then released from the first-level call-handling station 16, and the second-level call-handling station 20 communicates with the right-party.

When the communication is completed, the call is terminated, and the person at the second-level call-handling station 20 resets its available flag so that it can take another call. The call-handler at the second-level call-handling station 20 can also update the database 12 with information such as notes from the telephone conversation, payment schedules, updated telephone numbers, and the like.

In an alternative embodiment, voice conferencing is utilized. The first-level call-handling station 16 sends a routing signal to the predictive dialer 10. The predictive dialer 10 then routes the call and corresponding account information to the second-level hunt group 22. The second-level hunt group 22 searches for a flag of an available second-level call-handling station 20. When an available flag is found, the second-level hunt group 22 routes the call and corresponding account information in a coordinated transmission to the available second-level call-handling station 20. The first-level call-handling station 16 can then communicate with the second-level call-handling station 20 and the right-party simultaneously. When the first-level call-handling station 16 terminates communication, the call and corresponding account information is released from the first-level call-handling station 16, but maintained with the second-level call-handling station 20.

In yet another alternative embodiment, pre-selected routing is utilized. Right-parties meeting specific criteria are routed to a specific second-level call-handling station 20. Alternatively, where multiple second-level hunt groups 22 are utilized, right-parties meeting specific criteria are routed to a specific single second-level hunt group 22 or to multiple second-level hunt groups 22. For example, second-level call-handling stations 20 associated with a single second-level hunt group 22 may be better suited to communicate with right-parties meeting a specific criteria while second-level call-handling stations 20 associated with another second-level hunt group 22 are better suited to communication with right-parties meeting a second set of specific criteria. In this manner, right-parties are routed to the second-level hunt group 22 or multiple second-level hunt groups that have associated second-level call-handling stations 20 best able to communicate with that right-party. Some possible embodiments could also include multiple first-level hunt groups 14.

When right party contact is established, the predictive dialer 10 uses look-up tables to compare criteria or data associated with the right-party with criteria associated with specific second-level hunt groups 22. The predictive dialer 10 then routes the right-party to the specific or predetermined second-level hunt group 22 or multiple second-level hunt groups 22 that match the criteria associated with the right-party. In one possible embodiment, the predictive dialer automatically selects criteria for comparison to the look-up table. In another possible embodiment, the criteria is manually entered by an operator such as the call handlers manning the first-level call-handling station 16. In yet another possible embodiment, the specific or predetermined second-level hunt group 22 is selected manually or though means other than a look-up table. Any type of predetermined data can be manually entered or automatically selected for comparison to the look-up table for predetermined routing. Examples include telephone numbers, area codes, country codes, account numbers, names, particular data associated with an account, language spoken by the person on the connected call, and particular information that a caller provides to a first-level call-handling station 16.

As described herein, the multi-level call-handling system routes calls between various system components. For example, the first-level hunt group 14 routes calls by controlling the PBX 11 to transfer the call to one of the first-level call-handling stations 16. If right-party contact is made, the first-level call-handling station 16 passes control of the call to the second-level hunt group 22, which routes calls by controlling the PBX 11 to transfer the call to one of the second-level call-handling stations 20.

Inbound calls 26 are received through the PBX 11. The PBX 11 routes inbound calls to the second-level hunt group 22. In one possible embodiment, the integrated dialing unit 28 is programmed with a screen-pop software, which identifies the telephone number of the inbound call and retrieves account information from the database 12 that is associated with that telephone number. One such system is the Answered Call Distribution System, which is manufactured by NEC of Irving, Tex. and included within the NEC PBX's. The second-level hunt group 22 then routes the call and corresponding account information to the next available second-level call-handling station 20.

In an alternative embodiment, the PBX 11 routes the call to an inbound call receiver (not shown). The inbound call receiver may be a receptionist or an automated voice answering system. When the inbound call 26 is received, the inbound call receiver answers the telephone call and determines to whom the call should be transferred. If the inbound call receiver is a person, he/she manually transfers the call to the appropriate call-handling station or the appropriate hunt group. Alternatively, if the inbound call receiver is an automated voice answering system, the caller simply enters an extension of the call-handling station to which they wish to speak. The automated voice answering system automatically transfers the call.

The second-level call-handling station 20 also makes outbound calls 18 through the PBX 11 as needed and when not taking inbound calls. Typically, these outbound calls are return calls where a previously called party told the call-handler to call back at a certain time. The second-level call-handling station 20 dials the appropriate telephone number and asks for the right-party. When right-party contact is established, the second-level call-handling station 20 communicates with the right-party. When the communication is completed, the call is terminated, and the second-level call-handling station 20 resets its available flag.

The database 12 may be a software application that is run on a computer. The software is loaded into memory from a storage medium, such as a hard drive, and is processed by the processor. One type of software application that can be used for the predictive dialer and database is the software included in the SmartDial predictive dialing system, which is manufactured by Information Access Technologies, Inc. of Salt Lake City, Utah.

In an alternative embodiment, individual components of the multi-level telephone system are located off-site or remotely from the main system. In one possible example, a call-handling station 16 or 20 is operated by a person from his/her home or some other remote facility. In another possible example, the call-handling stations 16 or 20 are operated by people in a foreign country. In another possible example, the predicative dialer 10 or the integrated dialing unit 28 are located in one country while the second-level call-handling stations 20 are located in another country. When one of the call-handling stations 16 or 20 are located in a remote location, the call handling stations 16 and 20 communicate with the integrated dialing unit 28 via modems and telephone lines or any other suitable means for electrical communication. Other suitable means for electrical communication include communication over the Internet, via radio, or via satellites.

These alternative embodiments are advantageous because a smaller facility can be utilized. Furthermore, a firm can provide flexibility to its employees and can also take advantage of lower labor costs in a different locale. These advantages further reduce operating costs for the firm.

In yet another possible embodiment, the integrated dialing unit 28 is loaded with software that can track statistical usage of the system. For example, the software includes a plurality of timers for tracking information such as the duration of each call, the duration of the interval between each call, the number of calls made by the dialer, the number of calls handled by each call-handling station, and the number of right-party contacts that are established. The software can then generate statistical reports that are useful to identify training and staffing requirements. In one possible embodiment, the software automatically logs such information upon such events as the predictive dialer 10 placing a call, the call-handling station setting an availability flag to its associated hunt group, and disconnecting a call.

Figure 2:
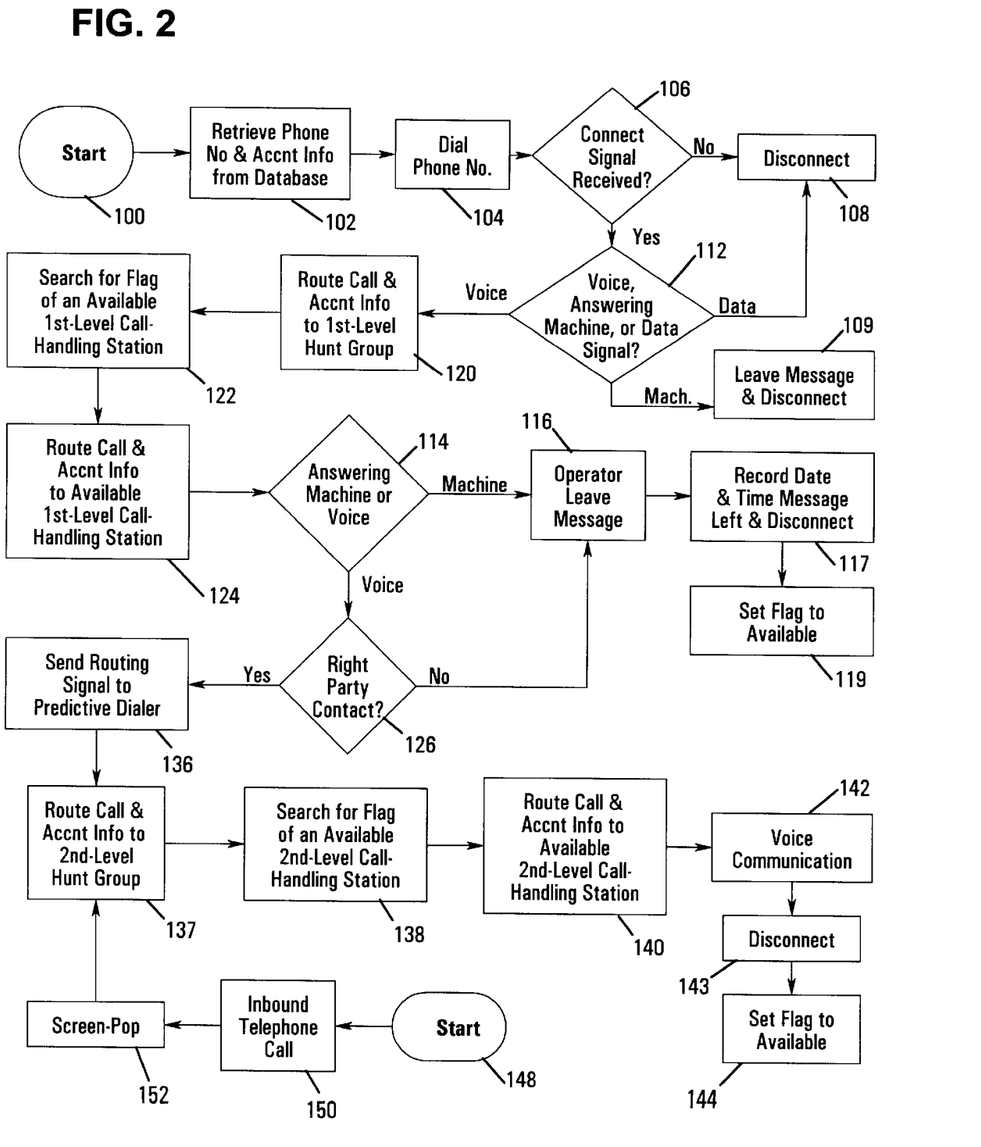
FIG. 2 is a flow chart depicting control of the calls as handled by the multi-level telephone system.

Referring now to FIG. 2, one possible embodiment of the multi-level telephone system operates according to the flow chart shown. The system begins at start block 100. At block 102, the predictive dialer 10 retrieves a telephone number and corresponding account information from the database 12. The predictive dialer 10 dials the telephone number at block 104. At block 106, the predictive dialer 10 determines whether a connect signal has been received. If not, program control is transferred to block 108 and the call is disconnected. Returning to block 106, if a connect signal is received, the call filter 13 determines at block 1 12 whether the signal is a voice signal, answering machine, or data signal. Generally, data signals are those signals transmitted and received by fax machines and computer modems. If the connect signal is a data signal, the flow of the program proceeds to block 108, and the call is disconnected. If the connect signal is an answering machine, an automated message is left and the call is disconnected at block 109.

Returning to block 112, if the call filter 13 detects a voice signal, the program proceeds to block 120 and the predictive dialer routes the call and corresponding account information to a first-level hunt group 14. The first-level hunt group 14 searches for a flag of an available first-level call-handling station 16 at block 122. When an available flag is found, the first-level hunt group 14 routes the call and corresponding account information to the available first-level call-handling station 16 at block 124.

The call filter 13 is not completely accurate at filtering out non-voice calls. Therefore, the first-level call-handling station 16 initially determines whether there is a voice, answering machine, or data at block 114. If data is detected, the call is terminated. If an answering machine is detected, flow of the program proceeds to block 116, and the first-level call-handling station 16 leaves a message on the answering machine. Alternatively, an automated message may be left. Then, the first-level call-handling station 16 records the date and time the message was left in the database 12 by pressing a function key on its computer, and the call is disconnected at block 117. Alternatively, the recordation may be done automatically by the system when the call is disconnected. The first-level call-handling station 16 resets its available flag at block 119. The available flag allows the first-level hunt group 14 at block 122 to search for an available first-level call handling station 16. If the first-level call-handling station 16 is not going to be available, the call handler does not reset the available flag, and the first-level hunt group 14 will not be able to find the first-level call-handling station 16 at block 122.

Returning to block 114, if a voice is detected, the first-level call-handling station 16 determines whether it has a right-party contact at block 126. If there is not a right-party contact, flow of the program proceeds to block 116, and the first-level call-handling station leaves a message. Then, the first-level call-handling station 16 records the date and time the message was left in the database 12 by pressing a function key on its computer, and the call is disconnected at block 117. The first-level call-handling station 16 resets its available flag at block 119.

Referring back to block 126, if right-party contact is established, the first-level call-handling station 16 sends a routing signal to the predictive dialer 10 at block 136. The predictive dialer 10 then routes the call and corresponding account information to the second-level hunt group 22 at block 137. The second-level hunt group 22 searches for a flag of an available second-level call-handling station 20 at block 138. When an available flag is found, the second-level hunt group 22 routes the call and corresponding account information to the available second-level call-handling station 20 at block 140. The second-level call-handling station 20 then communicates with the right-party at block 142. When communication is completed, the call is disconnected at block 143, and the second-level call-handling station 20 resets its available flag. Alternatively, returning to block 126, the first-level call-handling station can route the call and corresponding account information directly to a second-level call-handling station 20. This direct routing occurs, typically, when the right-party requests a specific second-level call-handling station 20.

Inbound calls 26 start at block 148. The inbound call 26 is received at block 150 by the PBX 11. The integrated dialing unit 28 is programmed with a screen-pop, which identifies the telephone number of the inbound call and retrieves the account information from the database 12 that is associated with that telephone number at block 152. The PBX 11 then routes the call to the second-level hunt group 22 at block 137. The second-level hunt group 22 searches for a flag of an available second-level call-handling station 20 at block 138. When an available flag is found, the second-level hunt group 22 transfers the call and the corresponding account information to the available second-level call-handling station 20 at block 140. The second-level call-handling station 20 then communicates with the right-party at block 142. When communication is completed, the call is disconnected at block 143, and the second-level call-handling station 20 resets its available flag.

In one embodiment, the number of first- and second-level call-handling stations that need to be activated and staffed are determined by certain characteristics of the equipment and the call handlers including the number of calls placed by the predictive dialer 10, the connect rate of those calls, the right-party contact rate of the connected calls, the average number of calls handled by one first-level call-handling station 16, and the average number of calls handled by one second-level call-handling station 20.

To activate a first- or second-level call handling station 16 and 20, the call handler communicates to the system that it is available to accept telephone calls. In one possible embodiment, the call handler keys in a character string or code that logs in the call handler and communicates to the system that the call handler is available. For example, the call handler may simply key in a username and/or a password from the call-handling station at which they are working. Different logins may be used for different applications. For example, one username and password may indicate to the system that the call handler is available to take right party contacts in general. A second username and password may indicate to the system that the call handler is available to take specific types of calls. Examples of different classifications for calls include calls to debtors that are delinquent for a certain period of time, calls to debtors that are delinquent on certain accounts, calls to people in certain geographic areas, and calls to debtors that are have certain demographics.

The number of first-level call handling stations 16 that need to be activated at any given time is determined from the following equation:

$$(DIAL*CONNECT)/1ST\_LEV\_CALLAVE=1ST\_LEV\_HOURS,$$

where DIAL is the number of dials made by the predictive dialer 10; CONNECT is the percentage of calls that are answered, excluding the number of calls managed by automation; 1ST_LEV_CALLAVE is the statistical average number of calls that a person staffing a first-level call-handling station 16 can handle in one hour; and 1ST_LEV_HOURS is the number of man hours of operation for the first-level of call-handling stations 16 needed for each hour that the installation is operating.

The necessary number of activated second-level call-handling stations 20 is determined from the following equation:

$$(DIAL*CONNECT*R\_CONNECT)/2D\_LEV\_CALLAVE=2D\_LEV\_HOURS,$$

where R_CONNECT is the percentage of calls where the right party is available and 2D_LEV_CALLAVE is the statistical average number of calls that a person staffing a second-level call-handling station 20 can handle in one hour; and 2D_LEV_HOURS is the number of man hours of operation for the second-level of call-handling stations 20 needed for each hour that the installation is operating.

The values used for CONNECT and R_CONNECT can be determined according to industry standards or on a case-by-case basis according to factors such as the efficiency of the call handlers at a particular installation, the time of day, or demographic information. Thus, examples of factors that might affect the values for the variables CONNECT and R_CONNECT include the time of day, the day of the week, whether it is a holiday, whether the system is equipped with equipment like a call filter 13, etc. Further factors such as the delinquency of the account may further affect the value for R_CONNECT. Statistical averages can be used for CONNECT and R_CONNECT. In one possible embodiment, 32% is used for CONNECT and 23% is used for R_CONNECT.

The values used for 1ST_LEV_CALLAVE and 2D_LEV_CALLAVE will depend on a variety of factors such as the efficiency of the call handlers that are manning the first- and second-level call handling stations 16 and 20. Examples of factors that might further affect the value of 2D_LEV_CALLAVE include the time of day; whether it is a weekday, the week end, or a holiday; the delinquency of the accounts being called if the automated right-party contact telephone system is installed at a collection agency, etc.

The values of 1ST_LEV_CALLAVE and 2D_LEV_CALLAVE can be determined according to industry standards or on a case-by-case basis according to factors such as the efficiency of the call handlers at a particular installation, the time of day, or demographic information. In one possible embodiment, the value for 1ST_LEV_CALLAVE is 76 per hour and the value for 2D_LEV_CALLAVE is 20 per hour. Although the 1ST_LEV_CALLAVE can vary, most installations will try to keep the value at or above a minimum threshold such as 60, especially when initially installing a system as described herein. This minimum value for 1ST_LEV_CALLAVE ensures a minimum level of production. Furthermore, the value may increase as the call handlers at the first-level call-handling stations 16 become more efficient and handle more calls per hour.

The required ratio for activated or staffed first- and second-level call handling stations 16 and 20 is then determined by the ratio:

1ST_LEV_HOURS/2D_LEV_HOURS.

If different groups of first- and second-level call handlers are logged in to take specific types of calls, this ratio would be used to determine the number of first- and second-level call handling stations 16 and 20 to activate and staff for each group. Thus if there was two groups, the ratio and the equations would be used once for each group. If only the second-level call handlers are divided into two or more groups and each group, on average, requires a different amount of time to handle each call, then the ratio of average call lengths for each group are used to allocate the active and staffed second-level call-handling stations 20 between the groups.

EXAMPLE 1

In one example embodiment, the predictive dialer 10 dials 9942 calls per hour. The connect rate of the 9942 calls is approximately 32% or 3181 connects. One first-level call-handling station 16 can handle approximately 76 calls per hour. Therefore, utilizing the equation (DIAL*CONNECT)/1ST_LEV_CALLAVE=1ST_LEV_HOURS, the first-level call-handling stations 16 would need approximately 42 man hours of operation for each hour that the installation is operating.

The right-party connect rate is approximately 23% or 732 right parties. One second-level call-handling station 20 can handle approximately 20.6 calls per hour. Therefore, utilizing the equation (DIAL*CONNECT*R_CONNECT)/2D_LEV_CALLAVE=2D_LEV_HOURS, the second-level call-handling stations 20 would need 36 man hours of operation for each hour that the installation is operating. Thus the ratio between first- and second-level call-handling stations 16 and 20 is about 42/36. Thus, for the most efficient staffing and operation of the system, there should be 42 staffed or activated first-level call handling stations 16 for every 36 second-level call-handling stations 20.

EXAMPLE 2

Suppose the equations and ratios set forth above are used to determine that 72 second-level call-handling stations 20 are required to be staffed and that the second-level call handlers are divided into two groups. One group handles one type of call that requires an average of 1 minute per call, and the other group handles another type of call that requires an average of 2 minutes per call. The 72 activated and staffed second-level call-handling stations 20 would be allocated so that 24 would handle the first type of call and 48 would handle the second type of call. In one possible embodiment for this example, the each group of second-level call-handling stations 20 is allocated between separate second-level hunt groups or separate sets of second-level hunt groups. In another possible embodiment all of the second-level call-handling stations 20 are connected to the same second-level hunt group.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A hierarchical system for routing outbound telephone calls between first and second groups of call-handling stations, the hierarchical system comprising:
   a dialer configured to dial an outbound telephone call;
   a first hunt group configured and arranged to route the outbound telephone call placed by the dialer to a call-handling station within the first group of call-handling stations; and
   a second hunt group configured and arranged to route the outbound telephone call placed by the dialer to a call-handling station within the second group of call-handling stations;
   the first hunt group and first group of call-handling stations being in one hierarchical level and the second hunt group and second group of call-handling stations being in another hierarchical level; and
   wherein an operator staffing a call handling station in the first group of call-handling station determines whether a right-party contact is available to talk on the outbound telephone call and transfer the call to the second hunt group when the right-party contact is available.

2. A system for routing telephone calls between first and second groups of call-handling stations according to claim 1, further comprising a database containing account information and telephone numbers connected to the dialer.

3. A system for routing telephone calls between first and second groups of call-handling stations according to claim 2, wherein the database is a software application running on a computer.

4. A system for routing telephone calls between first and second groups of call-handling stations according to claim 1, further comprising a call filter connected to the dialer for filtering out data signals.

5. A system for routing telephone calls between first and second groups of call-handling stations according to claim 1, wherein the dialer is a computer.

6. A system for routing telephone calls between first and second groups of call-handling stations according to claim 1, wherein the dialer and the first and second hunt groups are a unitary unit.

7. A system for routing telephone calls between first and second groups of call-handling stations according to claim 6, wherein the dialer, the database, and the first and second hunt groups are a unitary unit.

8. A system for routing telephone calls between first and second groups of call-handling stations according to claim 6, wherein the dialer, the call filter, and the first and second hunt groups are a unitary unit.

9. A system for routing telephone calls between first and second groups of call-handling stations according to claim 1, wherein the telephone call is automatically routed to both the first and second hunt groups.

10. A system for routing telephone calls between first and second groups of call-handling stations according to claim 9, wherein the telephone call is simultaneously connected to both the first and second hunt groups.

11. A system for routing telephone calls between first and second groups of call-handling stations according to claim 1, further comprising an inbound call receiver configured and arranged to receive inbound calls and route them to the second hunt group.

12. A hierarchical system for routing outbound telephone calls between call-handling stations, the hierarchical system comprising:
   a dialer configured to dial an outbound telephone call and transfer the outbound telephone call to a first hunt group for connection to a first call-handling station for determining whether a right-party contact is available, the dialer being responsive to routing signals received from the first call-handling station; and
   a second hunt group configured and arranged to route the outbound telephone call placed by the dialer to a second call-handling station when the right-party contact is available and upon receiving a call routing signal from the first call-handling station;
   the first hunt group and first cal-handling station being in one hierarchical level and the second hunt group and second call-handling station being in another hierarchical level; and
   wherein an operator staffing the first call-handling station can determine whether a right-party contact is available to talk on the outbound telephone call and transfer the call to the second hunt group when the: right-party contact is available.

13. A system for routing telephone calls between call-handling stations according to claim 12, further comprising a database containing account information and telephone numbers connected to the dialer, the first hunt group, and the second hunt group.

14. A system for routing telephone calls between call-handling stations according to claim 13, wherein the database is a software application running on a computer.

15. A system for routing telephone calls between call-handling stations according to claim 12, wherein the dialer is a computer.

16. A system for routing telephone calls between call-handling stations according to claim 12, wherein the telephone call is automatically routed to both the first and second hunt groups.

17. A system for routing telephone calls between call-handling stations according to claim 16, wherein the telephone call is simultaneously connected to both the first and second hunt groups.

18. A system for routing telephone calls between call-handling stations according to claim 12, further comprising an inbound call receiver configured and arranged to receive inbound calls and route them to the second hunt group.

19. A system for routing telephone calls between call-handling stations according to claim 12, wherein the call-handling station is a computer and a telephone.

20. A system for routing telephone calls between call-handling stations according to claim 19, wherein the call-handling station is a computer with an integral telephone.

21. A system for routing telephone calls between call-handling stations according to claim 12, wherein the call-handling station is a computer and a videophone.

22. A method for routing telephone calls between first and second groups of call-handling stations, the method comprising:
   automatically placing an outbound telephone call;
   routing the outbound telephone call to a call-handling station within the first group of call-handling stations;
   determining whether the right-party contact is available to talk on the outbound telephone call while the outbound telephone call is routed to the call-handling station within the first group of call-handling stations; and
   routing the outbound telephone call to a call-handling station within the second group of call-handling stations when the right-party contact is available.

23. The method for routing telephone calls between first and second groups of call-handling stations according to claim 22, further comprising the step of retrieving a telephone number and corresponding account information from a database.

24. The method for routing telephone calls between first and second groups of call-handling stations according to claim 22, further comprising the step of searching for an available call-handling station within a first group of call-handling stations.

25. The method for routing telephone calls between first and second groups of call-handling stations according to claim 22, further comprising the step of searching for an available call-handling station within a second group of call-handling stations.

26. The method for routing telephone calls between first and second groups of call-handling stations according to claim 22, further comprising the step of releasing the telephone call from the call-handling station within the first group of call-handling stations upon routing the telephone call to the call-handling station within the second group of call-handling stations.

27. The method of routing telephone calls between first and second groups of call-handling stations according to claim 22, wherein the telephone call remains connected to the call-handling station within the first group of call-handling stations upon routing the telephone call to the call-handling station within the second group of call-handling stations.

28. The method of routing telephone calls between first and second groups of call-handling stations according to claim 27, comprising the additional step of manually disconnecting the telephone call from the call-handling station within the first group of call-handling stations while maintaining the telephone call with the call-handling station within the second call-handling station.

29. A method for routing outbound telephone calls between a first-level call-handing station and a second-level call-handling station selected from a plurality of second-level call-handling stations, the method comprising:
   routing the outbound telephone call to the first-level call-handling station;
   determining whether the right-party contact is available to talk on the outbound telephone call while the outbound telephone call is routed to the first-level call-handling station;
   selecting a criterion;
   matching a second-level call handling station and the selected criterion; and
   routing the outbound telephone call to the matched second-level call-handling station when the right-party contact is available.

30. The method of claim 29 wherein a lookup table associates at least one of the second-level call-handling stations with a predetermined criterion, the step of matching a second-level call handling station and the selected criterion includes the step of comparing the selected criterion to the predetermined criterion listed in the lookup table.

31. The method of claim 29 wherein each second-level call handling station is in electrical communication with one of a plurality of hunt groups, the step of matching a second-level call handling station and the selected criterion includes the step of matching one of the hunt groups and the selected criterion.

32. The method of claim 29 wherein the step of selecting a criterion is performed manually.

33. The method of claim 29 wherein the step of selecting a criterion is performed automatically.

34. A method of operating a system for routing telephone calls between first and second groups of call-handling stations, the method comprising:

activating a predetermined number of call-handling stations in the first group;

activating a predetermined number of call-handling stations in the second group; and determining the relative number of first call-handling stations from a first equation:

$$(DIAL*CONNECT)/1ST\_LEV\_CALLAVE = 1ST\_LEV\_HOURS$$

wherein DIAL represents a number of calls per hour placed by a predictive dialer; CONNECT represents a connect rate for the calls placed by the predictive dialer; and $1ST\_LEV\_HOURS$ represent an average number of calls handled per hours by one first call-handling station determining the relative number of second call-handling stations from a second equation:

$$(DIAL*CONNECT*R\_CONNECT)/2D\_LEV\_CALLAVE = 2D\_LEV\_HOURS$$

wherein $2D\_LEV\_HOURS$ represents a right-party connect rate; and $2D\_LEV\_HOURS$ represents an average number of calls handled per hour by one second call-handling station.

35. The method of claim 34 wherein:

the step of activating a predetermined number of call-handling stations in the first group is performed by staffing the predetermined number of call-handling stations with people; and the step of activating a predetermined number of call-handling stations in the second group is performed by staffing the predetermined number of call-handling stations with people.

36. The method according to claim 34 wherein CONNECT is approximately 32% and R_CONNECT is approximately 23%.

37. The method according to claim 34 wherein $1ST\_LEV\_CALLAVE$ is approximately 76 per hour and $2D\_LEV\_CALLAVE$ is approximately 20 per hour.

* * * * *

UNITED STATES PATENT AND TRADEMARK OFFICE
CERTIFICATE OF CORRECTION

PATENT NO. : 6,285,752 B1
APPLICATION NO. : 09/216274
DATED : September 4, 2001
INVENTOR(S) : Rice It is certified that error appears in the above-identified patent and that said Letters Patent is hereby corrected as shown below:

Title page, item [57] Abstract, line 2: "aid" should read --and--

Col. 2, line 44: "represent" should read --represents--

Col. 2, line 45: "per hours" should read --per hour--

Col. 2, line 54: "handlino" should read --handling--

Col. 3, line 53: "PCbased" should read --PC-based--

Col. 4, line 15: "include" should read --includes--

Col. 7, line 16: "PBX's" should read --PBXs--

Col. 8, line 33: "1 12" should read --112--

Col. 10, line 11: delete "are"

Col. 11, line 27: "are" should read --is--

Col. 11, line 54: "EXAMPLE 2" should be centered.

Col. 13, line 23: "cal-handling" should read --call-handling--

Col. 13, line 30: "the:" should read --the--

Col. 14, line 45, claim 28: "second call-handling" should read --second group of call-handling stations--

Col. 14, line 65, claim 30: "call handling" should read --call-handling--

Col. 15, line 2, claim 31: "call handling" should read --call-handling--

Col. 15, line 4, claim 31: "call handling" should read --call-handling--

Col. 15, line 21: Equation should end with a comma --HOURS,--

UNITED STATES PATENT AND TRADEMARK OFFICE
CERTIFICATE OF CORRECTION

PATENT NO. : 6,285,752 B1
APPLICATION NO. : 09/216274
DATED : September 4, 2001
INVENTOR(S) : Rice It is certified that error appears in the above-identified patent and that said Letters Patent is hereby corrected as shown below:

Col. 15, line 26: "represent" should read --represents--

Col. 15, line 27: "hours" should read --hour--

Col. 16, line 5: Equation should end with a comma --HOURS,--

Signed and Sealed this

Twenty-ninth Day of January, 2008

JON W. DUDAS
*Director of the United States Patent and Trademark Office*